METHOD OF FORMING OHMIC CONTACTS IN SEMICONDUCTOR DEVICES

Filed Jan. 23, 1964

Inventors
James P. Murdock
James E. Schroeder
By Ronald C. McGaughey
Attorney

United States Patent Office 3,396,454
Patented Aug. 13, 1968

3,396,454
METHOD OF FORMING OHMIC CONTACTS IN SEMICONDUCTOR DEVICES

James P. Murdock, West Allis, and James E. Schroeder, Greendale, Wis., assignors to Allis-Chalmers Manufacturing Company, Milwaukee, Wis.
Filed Jan. 23, 1964, Ser. No. 339,686
6 Claims. (Cl. 29—494)

This invention relates generally to methods for soldering semiconducting materials. More particularly, this invention is concerned with a new and improved method of soldering ohmic contacts in semiconductor devices by fusing together alternate layers of solder metals previously plated onto the contact faces.

One of the major problems encountered in the manufacture of semiconducting devices, particularly power rectifiers, is the formation of a good ohmic contact between the semiconducting bodies or between a semiconducting and a conducting body. An ohmic contact is a conductive contact in such devices as power rectifiers other than the rectifying junction itself.

One of the problems encountered is the difficulty of getting the solder metal to adhere to the semiconductor. Semiconductors such as silicon and germanium are so different in structure from the solder metals used that even if the solder does adhere to the semiconductor, there is seldom 100 percent wetting of the semiconductor contact surface. With limited wetting of the semiconductor contact surface, current flow is restricted to the wetted areas which causes localized heating in service and thus severely limits the capabilities of the device. Furthermore, the solders being metals or metal alloys, have a greater coefficient of thermal expansion than do the semiconductors. Therefore, changes in temperature set up stresses at the soldered joint which further limit the device's temperature range capabilities. These disadvantages are especially troublesome in power rectifiers where varying service conditions can cause substantial heat cycling.

Many methods have been developed and proposed to improve the soldered joints in ohmic contacts, but the problems have not been completely eliminated.

The latest developments in the soldering of ohmic contacts have been in the use of solder foils. By such methods, a sheet of solder foil is cut to shape and placed between the two pieces to be soldered. The pieces are then simply pressed together, sandwiching the foil therebetween. The sandwiched unit is then heated to melt the foil solder. When cooled, a solder joint results. At first simple monometallic foils were used because they are easily rolled and readily available. However, the most desirable solders, especially for higher power devices, have been the hard eutectic alloys of such metals as gold, silver, tin, germanium, silicon and so on. Since these alloys are extremely hard to roll into thin sheets, they could not at first be readily adopted to foil soldering. Today there are a few limited alloy foils such as 80% gold-20% tin and 88% gold-12% germanium. Such alloys are rather hard and therefore the processes for rolling the alloy foils are complex and expensive. As a result the foils produced are extremely expensive and thus not practical for commercial use. Many alloys that would be desirable as solders are entirely too hard to be rolled into foils. Some of the soft solders such as those of lead, indium, tine and gallium are capable of being rolled to extreme thinness, but then such soft solders are not practical in many semiconductor applications, such as power rectifiers, because of their inability to stand up under thermal cycling.

Further developments introduced single foils of multiple metal layers rolled together. For example, one foil now available commercially has a total of seven layers with tin layers alternating between gold layers. By rolling these layers together into a single sheet thinner total thicknesses can be achieved because the metals are present in the pure state rather than alloyed, and thus they are sufficiently malleable to be rolled. These foils have a disadvantage in that 100 percent wetting is still not attained, and the solder composition cannot be varied. Furthermore these foils, like the alloy foils are not easily fabricated. Thus again, high fabrication costs added to the high cost of the metals make these foils impractical for commercial use, and waste from cutting scrap is still prevalent.

It is conceivable that electroplating the solder onto the semiconductor would assure 100% wetting and several publications have described several methods for plating various alloys for purposes other than ohmic contacts. However, alloy plating of solders for ohmic contacts have not been seriously considered because there are only a limited number of alloys which can be plated. This excludes many desirable solder compositions. Furthermore, alloy plating, for the few alloys that can be plated, is a rather exacting procedure.

This invention is predicated upon our development of a new and improved method for soldering ohmic contacts which assures 100 percent wetting of the surface to be soldered, and which is much cheaper than using solder foils because there is no waste such as foil cutting scraps and costly foil fabrication is completely avoided. By our method the solder metals which make up the alloy are individually plated, electrolytically or otherwise, onto the two contact surfaces in alternate layers. Thereafter, the plated surfaces are placed in intimate contact and heated to diffuse and fuse the respective plated layers into each other to form the desired alloy. By this method, any alloy composition as may be desired can be attained by simply varying the thickness or number of the respective platings.

Accordingly, it is a primary object of this invention to provide a method for forming ohmic contacts in semiconductor devices which assures 100 percent wetting of the contact faces, and results in a strong bond between the parts.

It is another primary object of this invention to provide a method for forming ohmic contacts in semiconductor devices which is lower in cost and avoids waste from foil cutting scraps.

It is a further object of this invention to provide a method for forming ohmic contacts by plating wherein any alloy composition of the solder may be easily attained and closely controlled with any number of constituents without changing the plating baths or without the necessity for manufacturing special alloy foils for all the desired alloy compositions.

These and other objects and advantages are fulfilled by this invention as will become apparent from the following detailed description, especially when read in conjunction with the accompanying drawings in which.

Figure 1:
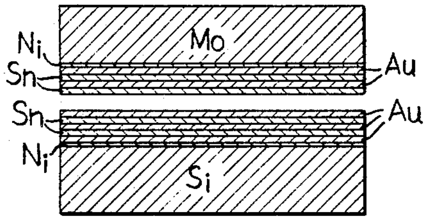
FIG. 1 is a drawing showing the two pieces to be joined after having had their respective contact faces plated with alternate layers of the alloy metals. The thickness of the respective plated layers has been greatly exaggerated so that the change in structure may be easily shown.

As a preferred embodiment of this invention the following detailed description will describe the use of gold-tin alloys and an 80 percent gold-20 percent tin alloy in particular. This alloy is chosen for purposes of illustration only. It is one of the most favored ohmic contact solders because of its low melting point, extreme hardness, and excellent thermal and electrical conductivity. It should be understood, however, the gold-tin alloy is merely a preferred embodiment and that other solder alloys can be produced in a similar manner without departing from the scope of this invention.

As in any plating operation the surfaces to be plated must be clean, and since they are to be joined, they must be smooth and flat. Such preliminary steps as cleaning and the like are well known in the industry and thus need not be described here.

Although the actual plating may be done using either electrolytic or electroless plating techniques, we found that the best results are obtained by electrolytic methods. Several of the known electroplating procedures were tried and all were found to be operable. Thus the procedure or bath to be used will be determined by the individual operator.

To plate the gold several different plating solutions were tried and all were successful. For example, the standard potassium-gold cyanide solution worked well with a stainless steel anode and at a current density of 25 ma./in.$^2$, but required solution temperatures in excess of 140° F. The gold bath we found to be most effective however, was the commercial Orotherm HT gold bath (Technic, Inc., Providence, R.I.).

Two tin baths found to be effective in varying degrees were an acid fluoborate tin bath and an alkaline tin bath. The alkaline tin bath has one disadvantage in that a "smut," which is probably a tin oxide, is deposited on the samples after about five to seven alternate gold-tin layers. Acid washing and cathodic cleaning will, to a very limited extent, remove the "smut" but not sufficient as may be desired in semiconducting devices. The fluoborate bath, on the other hand, is more desirable since it causes no "smut" formation regardless of the number of layers. With the fluoborate bath the plating rate is quite high, which will necessitate a power supply that is able to produce low, controllable currents.

Accordingly, the most desirable plating procedures would be those which provide a good pure deposit and have a low plating rate so that the amount of plated deposit can be closely controlled. In this respect then, the standard Orotherm HT gold bath, and the acid fluoborate tin bath work well with the proper power supply.

Tables I and II below detail ideal compositions of the two plating baths and the plating parameters respectively as may be used in the practice of this invention. These tables, however, are merely meant to be illustrative of typical ideal conditions and should not limit the scope of this invention.

TABLE I.—COMPOSITIONS OF PLATING BATHS

| Orotherm HT Gold Bath | Acid Fluoborate |
|---|---|
| Orotherm additive #1, 300 gm. | Stannous Fluoborate Sn $(BF_4)_2$, 200 gm./l. |
| Orotherm additive #2, 250 ml. | Metallic tin, Sn, 81 gm./l. |
| Orotherm HT 24k A.B. Gold, 20.5 gm. | Fluoboric acid, $HBF_4$, 50 gm./l. |
| Add water to make 2.5 liters. | Boric acid, $H_3BO_3$, 25 gm./l. Gelatine, 6 gm./l. Beta naphthol, 1 gm./l. |

TABLE II.—PLATING DATA

| | Orotherm Gold | Acid Fluoborate Tin |
|---|---|---|
| Temperature | 25-30° C. | 25-30° C. |
| Cathode current density | 50 ma./in.$^2$ | 10 ma./in.$^2$ |
| Anodes | Platinized titanium | Tin. |
| pH | 4.5-5.0 | 1.0-2.0. |
| Anode to cathode ratio | 2:1 | 2:1. |
| Agitation necessary | Circulate through filter | Yes. |

The compositions of the two plating baths and the plating data as expressed above in the tables may be varied somewhat to meet personal preference. It should be kept in mind, however, that the rate of deposition should be kept low so that the amount of deposition may be closely controlled. In this regard temperature and current density are most critical and should be kept at minimum values. As a rule of thumb, temperatures should be on the order of room temperature, and current densities on the order of ten to fifty milliampers per square inch. This rule applies only to the two plating solutions discussed above and will vary with different plating solutions according to the individual solution's plating rate. For example, with the alkaline tin bath mentioned above, the most satisfactory combination was 100 milliamperes per square inch at 65%.

Figure 4:
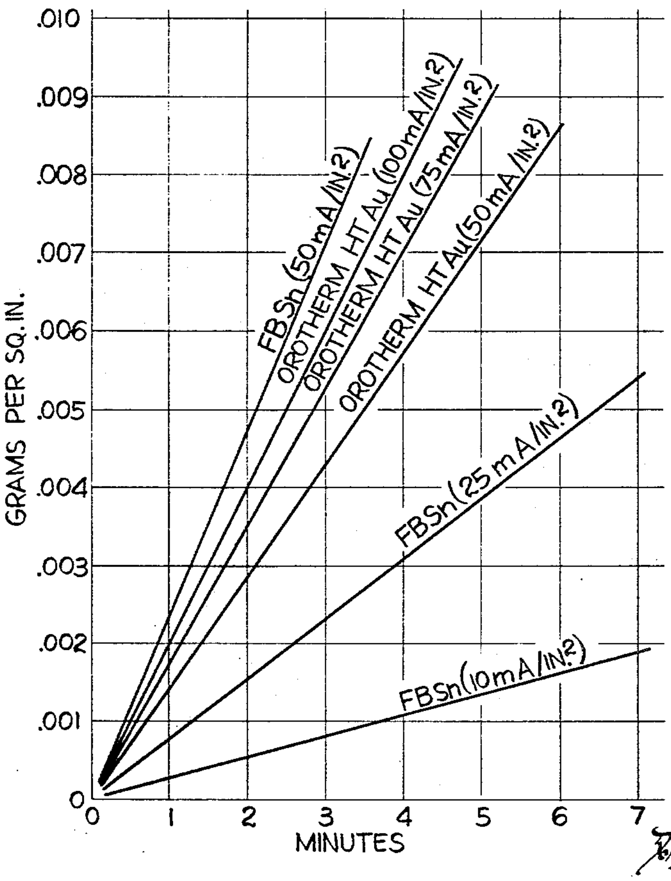
FIG. 4 is a graphic representation of the rate of deposit for various gold and tin solutions given as weight per unit area as a function of time and current density.

The exact plating rates for the plating solution used should be known. This may be calculated by weight gain experimentation. Since the plating rate may vary as a function of time and current density, it is recommended that the respective plating rates be plotted graphically, as is shown in FIG. 4. In FIG. 4 the plating rates for the Orotherm HT gold bath and the acid fluoborate tin bath are shown at three different current densities. Such a graph then serves as a guide to plating time. For example, if an 80% Au-20% Sn eutectic alloy solder is desired, then plating equal, alternate layers of 0.008 gram per square inch gold and 0.002 gram per square inch tin would result in the desired alloy. Therefore, the graph indicates that the gold may be plated for 5½ minutes at 50 ma./in.$^2$ or if preferred for 4 minutes at 100 ma./in.$^2$ and the tin plated for 2½ minutes at 25 ma./in.$^2$ or for 7¼ minutes at 10 ma./in.$^2$. These examples are merely indicative of how such a graph may be used and should not limit the scope of this invention.

The thickness of each plated layer may of course be varied provided the relative amounts of the alloy metals are kept constant. However, as may be expected, many thin layers will result in a stronger bond than a few thick layers.

In the plating of gold and tin total layer weights of less than 0.006 gm./in.$^2$ of gold and less than 0.0015 gm./in.$^2$ tin will result in an extremely poor bond no matter how many layers are plated. For optimum results the total layer thickness should be from about 0.0003 to 0.0004 inch, with the total weight of gold being about 0.0320 gm./in.$^2$ and the total weight of tin being about 0.0080 gm./in.$^2$. Ideally there should be about eight to ten total alternate layers with each gold layer weighing from 0.0060 to .010 gm./in.$^2$ and each tin layer weighing from 0.0015 to .0025 gm./in.$^2$.

It is desirable that the alternate layers on each plated piece be so arranged that the last or outer layers on each piece be of different metals. For example, such a combination might be Au-Sn-Au-Sn-Au on one piece and Sn-Au-Sn-Au-Sn on the other if ten layers are desired. It is not necessary, however, that the pieces have equal numbers of plated layers so long as there is at least one plated layer on any semiconductor surface so that such surface may be completely wetted in the resulting solder joint. If, as in the usual case, one of the contact surfaces is not a semi-conductor but a conducting metal as, for example, nickel plated molybdenum or tungsten, which is fairly easily wetted by the solder, then all of the plated layers may be applied to the other surface, namely, the semiconductor surface.

When the plating is complete as described above, the contacts may be soldered. To do this the contact surfaces, with the plated layers therebetween, are placed in intimate contact with each other in such relationship as desired for the soldered joint. An applied pressure in excess of about 50 gms./cm.$^2$ should be used to maintain the contact while the unit is slowly heated in a non-oxidizing atmosphere for a sufficient time to diffuse and fuse the plated metals together to form the desired alloy in a molten state. Then the unit must be cooled slowly to room temperature to solidify the alloy. In order to effect a good bond it is necessary that the contact pressure be maintained throughout the entire heating and cooling cycle. The contact pressure should be enough to maintain the pieces in tight contact, but not so great as may cause the semiconductor or solidified solder to fracture. Contact pressures in the range of from 50 to 300 gms./cm.$^2$ have proved satisfactory for all solders tested with a preferred pressure of about 200 gms./cm.$^2$ being most effective in gold-tin solder joints.

The contact pieces and the solder metals should not be allowed to oxidize during the heating cycle, otherwise the conducting properties of the device may be detrimentally affected. Therefore, the heating should be conducted in an inert atmosphere or more preferably in a reducing atomsphere.

Because the solder metals and the semiconductor material will usually have substantially different coefficients of thermal expansion, the heating and cooling of the contacting unit should proceed at a rate slow enough to prevent fracture of the solder or semiconductor. We have found heating and cooling rates from about 2 to 3° F./min. to be quite satisfactory.

The temperature ultimately achieved should somewhat exceed the melting temperature of the anticipated alloy even though this temperature may be below the melting point of either or both of the pure metals plated. By this procedure, the elevated temperature causes diffusion of the respective plated metals across the interface even though the pure metals themselves may not be melted. The diffusion intermingling at the interface will usually cause a reduction in the melting temperature in the bimetal region at the interface to enhance the diffusion rate. When the metals are completely intermingled the entire plated volume is liquid since the melting temperature is reduced to that of the alloy formed. Temperatures greatly in excess of the melting point of the alloy should be avoided as higher temperatures will destroy the semiconductor characteristics or may even cause alloying action between the solder and the semiconductor or conductor end pieces.

Figure 2:
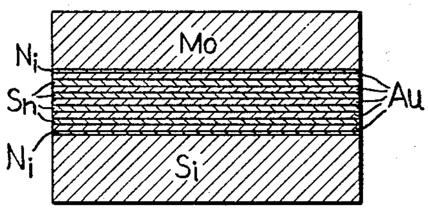
FIG. 2 is a drawing of the two pieces in intimate contact prior to heating to form the alloy.
Figure 3:
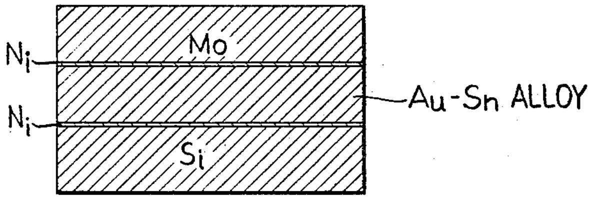
FIG. 3 is a drawing showing the nature of the finished ohmic contact after the respective plated layers have been heated to diffuse or fuse them into the solder alloy.

FIGS. 1 through 3 schematically illustrate the soldering action. FIG. 1 shows the two pieces, silicon and molybdenum joined after having alternate layers of metals, gold and tin plated thereon. In FIG. 2 the pieces are shown in intimate contact prior to fusing, and in FIG. 3 the completed solder joint is shown where the gold and tin have diffused into one another to form a gold-tin eutectic solder alloy. It should be noted that in this case the melting point of the tin is 232° C. and the melting point of the gold is 1066° C. Thus in heating, the tin layers are completely melted, then as the tin and gold diffuse into each other molten alloys form at the interfaces which dissolves the gold layers. When the two metals are completely intermingled into an 80–20 eutectic alloy the entire plated mass is molten. When cooled, the eutectic alloy solidifies at 280° C. to firmly bond the parts.

In a similar manner other metals may be plated to produce solder contacts of virtually any desired alloy composition. For example, other hard solders such as gold-germanium, gold-antimony, gold-silicon or a silver-germanium and so on may be desired. Similarly, contacts of soft solders such as those of indium, lead, cadmium, gallium, tin and the like, may also be produced by this alternate plating procedure.

To aid in a fuller understanding of our invention the following examples are presented as being typical. However, they are meant only to be illustrative of the invention herein described.

*Example I.—80% Au–20% Sn*

A silicon wafer and two molybdenum wafers were nickel plated electrolytically by a method well known in the semiconductor industry. The silicon wafer was plated in on Orotherm HT gold bath for two minutes and forty-five seconds at a current density of 50 ma./in$^2$ and then rinsed in deionized water. The wafer was then plated in a fluoboric tin bath for three minutes and forty-five seconds at a current density of 10 ma./in. and again rinsed in deionized water. This double plating procedure was repeated three times so that there were four gold layers and four tin layers. The two nickel plated molybdenum wafers were plated with the same procedure to produce two layers each of the alternate gold and tin. The plated silicon wafer was then sandwiched between the two molybdenum wafers, and the three wafers placed in a graphite jig with approximately 200 grams of applied pressure. The unit was heated, in a reducing atmosphere, to 325° C. in 100 minutes, maintained at 325° C. for 15 minutes and then cooled to room temperature over a period of six hours. The wafers were then pried apart (with great difficulty) and examination revealed that there had been 100% wetting of the wafer contact surfaces. The bond was stronger than any we have been able to achieve using solder foils.

*Example II.—80% Au–20% Sn*

The same procedure as described in Example I was again follower except that the gold layers were plated for three minutes at a current density of 100 ma./in.$^2$ and the tin layers were plated for one minute and fifty seconds at a current density of 25 ma./in.$^2$. When pried apart, an examination showed that there had again been 100% wetting of the wafer surfaces. The bond was as strong as any achieved with solder foils.

*Example III.—50% Pb–50% Sn*

This test was conducted to produce an ohmic contact with a 50–50 lead-tin solder. Two copper wafers were electrolytically plated with nickel. Each wafer was then plated with alternate layers of lead and tin (four layers each). The lead layers were plated for one minute in a fluoboric lead plating bath at a current density of 50 ma./in.$^2$. The tin layers were plated for five minutes in a fluoboric tin bath at a current density of 25 ma./in.$^2$. After each plating the wafers were rinsed with deionized water. The wafers were then placed in contact in a graphite jig with an applied pressure of 200 gm./in.$^2$. The contacting unit was then heated to 250° C. in a forming gas atmosphere at a rate of approximately 2° C./min. The temperature was maintained at 250° C. for thirty minutes and then the wafers were cooled to room temperature at a rate of 1° C./min. The wafers were then pried apart and examined. Wetting of the wafer surfaces was 100% and the solder bond had been quite strong for such a soft solder.

*Example IV.— 75% Au–25% Pb*

For this example, a solder composition of 75% gold-25% lead was effected. Two nickel plated copper wafers were plated with alternate layers of gold and lead, four layers of each. The gold layers were plated for five minutes in an Orotherm HT gold bath at a current density of 100 ma./in.$^2$. The lead layers were plated for forty-five seconds in a fluoboric lead bath at 50 ma./in.$^2$. A deionized water rinse followed each plating. The wafers were placed in contact and heated and cooled by the same procedure as described in Example III. Prying the wafers apart indicated that the strength of the bond was not the best, due to the nature of the alloy, but surface wetting of the wafers had been 100%.

The embodiments of the invention for which an exclusive property or privilege is claimed are defined as follows:

1. The method of soldering ohmic contacts in semiconductor devices with a solder alloy which comprises:

(a) plating at least one of the contact surfaces with alternate layers of the respective metals in elemental form and in such proportions as is desired in the solder alloy, and such that there are from seven to ten total layers of the plated metals;

(b) placing the contact surfaces in intimate contact with the plated layers sandwiched therebetween;

(c) heating the plated layers in a nonoxidizing atmosphere to a temperature above the melting point of the desired alloy;

(d) maintaining said temperature until the alternate plated metal layers diffuse and fuse into one another forming the desired alloy in a molten state;

(e) cooling the alloy at a sufficiently slow rate as will cause the alloy to solidify and effect the soldered contact without cracking of solder or contact pieces.

2. The method of soldering ohmic contacts in semiconductor devices with any desired solder alloy which comprises:

(a) plating at least one of the contact surfaces with alternate layers of the respective metals in elemental form as must be present in the desired alloy, in the respective total proportion as is desired in the solder alloy, and such that there are from seven to ten total layers with the total thickness ranging from 0.0003 to 0.0004 inch;

(b) placing the contact surfaces in intimate contact with the plated layers sandwiched therebetween;

(c) heating the plated layers in a nonoxidizing atmosphere to a temperature above the melting point of the desired alloy;

(d) maintaining said temperature until the alternate plated metal layers diffuse and fuse into one another forming the desired alloy in a molten state; and (e) cooling the alloy at a sufficiently slow rate as will cause the alloy to solidify and effect the soldered contact without cracking of solder or contact pieces.

3. The method of soldering ohmic contacts in a semiconductor device with any desired solder alloy composition, which comprises:

(a) plating at least one of the contact surfaces with alternate layers of the respective metals in elemental form as must be present in the desired alloy, in the respective total proportion as is desired in the solder alloy, and such that these are from seven to ten total layers with the total thickness ranging from 0.0003 to 0.0004 inch;

(b) placing the contact surfaces in intimate planar engagement with the alternate plated layers therebetween, with a contact pressure of at least fifty grams per square inch;

(c) heating the contacting unit in a reducing atmosphere to a temperature of the desired alloy to diffuse and fuse the plated metals into each other forming the desired alloy in a homogeneous molten state; and (d) cooling the alloy at a sufficiently slow rate as will cause the alloy to solidify and effect the soldered contact without cracking of solder or contact pieces.

4. The method of soldering ohmic contacts in a semiconductor device with any desired solder alloy which comprises:

(a) plating the contact surfaces with alternate layers of the respective metals in elemental form and in such proportions as desired in the solder alloy and such that there are from seven to ten total layers with the outside layer on each surface being of a different alloy;

(b) placing the contact surfaces in intimate planar engagement with the alternate plated layers therebetween, with a contact pressure of at least fifty grams per square inch;

(c) heating the contacting unit in a reducing atmosphere to a temperature of the desired alloy to diffuse and fuse the plated metals into each other forming the desired alloy in a homogeneous molten state; and (d) cooling the alloy at a sufficiently slow rate as will cause the alloy to solidify and effect the soldered contact without cracking of solder or contact pieces.

5. The method of soldering ohmic contacts in a semiconductor device with a gold-tin solder alloy which comprises:

(a) plating at least one of the contact surfaces with alternate layers of gold and tin in such total proportion as is desired in the solder alloy and such that there is a total of from seven to ten alternating layers of gold and tin with the total thickness ranging from 0.0003 to 0.0004 inch;

(b) placing the contact surfaces in intimate planar engagement, with the alternate layers therebetween, with a contact pressure of from fifty to three hundred grams per square centimeter;

(c) heating the contacting unit in a reducing atmosphere to a temperature above the melting point of the desired gold-tin alloy to diffuse and fuse the gold and tin layers into each other forming the desired alloy in a homogeneous molten state; and (d) cooling the alloy at a sufficiently slow rate as will cause the alloy to solidify and effect the soldered contact without cracking of solder or contact pieces.

6. The method of soldering ohmic contacts in a semiconductor device with a 20% tin–80% gold solder alloy which comprises:

(a) plating at least one of the contact surfaces with alternate layers of gold and tin so that each gold layer comprises at least about 0.006 gms./in.$^2$ and each tin layer comprises at least about 0.0015 gms./in.$^2$ with a total gold plate being about 0.032 gms./in.$^2$ and the total tin in plate being about 0.008 gms./in.$^2$;

(b) placing the contact surfaces in intimate planar engagement, with the alternate layers therebetween, with a contact pressure of about two hundred gms./square centimeter;

(c) heating the contacting unit to a temperature of about 325° C. for a period of about thirty minutes in a nonoxidizing atmosphere; and (d) cooling the contacting unit at a rate no faster than 1.5° C. per minute to room temperature to cause the molten alloy to solidify and effect the solder contact.

References Cited

UNITED STATES PATENTS

| | | | |
|---|---|---|---|
| 2,362,893 | 11/1944 | Durst | 29—504 |
| 2,945,285 | 7/1960 | Jacobs | 29—473.1 |
| 3,031,747 | 5/1962 | Green | 29—502 |
| 3,131,460 | 5/1964 | Allen | 29—504 |
| 3,209,450 | 10/1965 | Klein | 29—473.1 |

JOHN F. CAMPBELL, *Primary Examiner.*

L. J. WESTFALL, *Assistant Examiner.*